United States Patent Office 3,528,766
Patented Sept. 15, 1970

3,528,766
PROCESS FOR MAKING SODA ASH SUBSTANTIALLY FREE FROM ORGANICS
Joseph S. Coglaiti, Jr., and John N. Dallman, Green River, Wyo., assignors to Stauffer Chemical Company, New York, N.Y., a corporation of Delaware
No Drawing. Filed Apr. 18, 1966, Ser. No. 543,048
Int. Cl. C01d 7/00; B01d 15/06
U.S. Cl. 23—63                                        6 Claims

ABSTRACT OF THE DISCLOSURE

A process for the removal of soluble organic impurities from trona in the manufacture of dense soda ash which comprises contacting an aqueous solution of sodium carbonate with activated carbon to absorb and remove soluble inorganic impurities from said aqueous solution, subsequently contacting said activated carbon with water at a temperature substantially above the temperature employed in the absorption step to reactivate said active carbon, and thereafter, recovering dense soda ash as the product of the process.

---

Trona is a mineral found in abundance near Green River, Wyo., and contains in excess of 90% sodium sesquicarbonate, $Na_2CO_3 \cdot NaHCO_3 \cdot 2H_2O$. The sodium sesquicarbonate content of the trona is commercially important in the manufacture of soda ash which is made by two distinct type processes. These are the "Sesquicarbonate Process" and the "Monohydrate Process."

The "Sesquicarbonate Process" consists essentially in dissolving crude trona, filtering the resultant liquor to remove insolubles, recrystallizing relatively pure sodium sesquicarbonate and calcining said sodium sesquicarbonate at temperatures in excess of 400° C. (1) to convert the bicarbonate content of the sesquicarbonate crystals to sodium carbonate and (2) to remove substantially all of the organic matter from said crystals. This process results in a soda ash referred to in the trade as a light ash since it has a bulk density of approximately 30–35 lbs./cu. ft. which is not suitable for many uses. Consequently, this light ash must be converted to dense ash (50–60 lbs./cu. ft.) and this is accomplished by redissolving the light ash in water, recrystallizing to form sodium carbonate monohydrate which is then again calcined to drive off the water of hydration to form a dense soda ash.

The principal disadvantage of this process is that two separate crystallizations are required and that organic surface active agents are often added to the cycling mother liquor streams to obtain soda ash of proper crystal habit. This addition of organic materials compounds the organic removal problem and thus requires a more intense high temperature calcination.

The more direct and straightforward method is the "Monohydrate Process" since only a single crystallization is required and a dense ash is produced directly. In the "Monohydrate Process," the crude trona is first calcined at temperatures of 400° C. to 800° C. to convert the bicarbonate content of the trona to sodium carbonate and to remove substantially all of the organic matter present in the crude trona. The resulting crude soda ash is dissolved, filtered to remove insolubles and recrystallized as sodium carbonate monohydrate which in turn is dried to dense soda ash.

While this high temperature calcination of the crude trona removes substantially all of the organic contaminants and otherwise simplifies the process, a problem is also thereby created. Calcination of crude trona above 400° C. not only removes substantially all of the organics, but also converts insoluble silica contained in the trona ore to a soluble form which likewise results in product contamination. To minimize this product contamination, much greater amounts of mother liquor must be bled off stream so as to maintain the silica content of the liquor below the concentration at which it begins to precipitate. Obviously, this leads to decreased production and loss of carbonate values.

Thus it is an object of the instant invention to provide a process for preparing dense organic-free soda ash from crude trona by avoiding the use of surface active agents while maximizing recovery of soda ash values from the ore.

A still further object is to provide a process for the preparation of soda ash from crude trona with a shortened time cycle and increased production rate over the prior art.

Further objects will appear to those skilled in the art as the description of this invention unfolds.

Generally stated, this invention provides a process for preparing dense, organic-free soda ash by sizing the crude trona, calcining the crude trona to convert the crude trona to crude sodium carbonate, dissolving the crude sodium carbonate, filtering said solution to remove insolubles, removing the soluble organic matter from said solution by treating said solution with activated carbon, evaporating and crystallizing from said solution sodium carbonate monohydrate, calcining the monohydrate to produce dense, organic-free soda ash and recycling the mother liquor to process.

According to the subject invention, crude trona is mined and crushed to the appropriate size for calcining. Usually the trona is sized to approximately one-quarter inch but larger particles can be equally useful provided the residence time in the calciner is sufficient to convert all of the bicarbonate present to carbonate.

In calcining this sized trona, the calcination temperature is always maintained at less than 400° C. and preferably between 200° C. and 375° C. This calcination has a threefold effect—(1) the bicarbonate present in the crude trona is converted to sodium carbonate, (2) the crude sodium carbonate resulting from the calcination has a greater rate of solubility than the crude trona, and (3) this relatively low-temperature calcination, while it does not eliminate organic contaminants from the trona, does not increase the amount of soluble silica in the trona. A rotary, direct fired calciner may be used although other type kilns such as a vertical kiln or grate type calciner are equally suitable.

After the resulting crude soda ash exits the calciner, it passes to a dissolving unit. Although water may contact the hot crude soda ash directly to yield a sodium carbonate solution, such dissolution is not preferred due to the extremely hazardous reaction conditions associated therewith. Preferably, the hot crude soda ash is first contacted with a saturated aqueous solution of sodium carbonate which converts all of the incoming solid sodium carbonate values to sodium carbonate monohydrate. This sodium carbonate monohydrate slurry is then dissolved by the addition of sufficient water or preferably dilute sodium carbonate solution. The aforementioned hydration step and the dissolving step are both exothermic and by making them separate steps as defined above less heat is liberated at one time which greatly improves the process from a safety point of view.

After dissolution, the resulting sodium carbonate solution containing insoluble impurities is clarified and filtered to yield a sodium carbonate solution containing dissolved organic contamination and substantially no solid impurities. This clarified sodium carbonate solution is then contacted with activated carbon which quantitatively removes the organic materials which discolor the solution and soda ash made therefrom. The treatment of the solution with activated carbon can be accomplished in any manner since all that is necessary is actual physical contact. However, the preferred method is to pump the clarified sodium carbonate solution up through a packed bed of activated carbon at a temperature below about 190° F. and preferably between 150 and 170° F. This packed bed of activated carbon absorbs substantially all of the organic components instantaneously when the activated carbon is fresh but after day of use in a large scale operation the absorption rate decreases. The activated carbon is easily regenerated to full activity by the use of hot water. Generally, all that is needed is a hot water wash of the activated carbon at a temperature about 20° F. higher than the absorption temperature. Such regeneration will normally be carried out at temperatures in excess of about 190° F. A temperature of about 205° F. however is preferred although higher temperatures could be used.

In commercial operations, a plurality of such carbon columns would be arranged in parallel so that one set of columns could be in use while the other columns were being regenerated.

The carbon columns can be of any shape but as previously stated, they are preferably equipped with a liquor and hot water supply means at the bottom of the column and an outlet for the liquid at the top of the column. The column itself would consist of activated carbon resting on a screen which allows the liquid to pass through. On top of this packed bed of carbon would rest a plug type filter with openings large enough to allow the liquor to pass while retaining the activated carbon. During the organic removal from the liquor, the plug type filter maintains the activated carbon bed in a packed condition which minimizes the formation of fines formed by attrition and the downward migration of any fines formed in the packed bed. When regenerating such a packed bed, the plug type filter is removed to allow the bed of activated carbon to become somewhat fluidized by the hot water passing up through the activated carbon. The flow of hot water effects elutriation which causes any fines in the bed to migrate upward in the bed and finally to be carried off by the flow-rate of the water.

No other operation is necessary in regeneration of the activated carbon and it can be used repeatedly over extremely long periods of time. Beds of activated carbon in use for over a year might possibly be rendered less active due to scale buildup, but this can be removed by a simple muriatic acid rinse.

Numerous variations of the instant invention will be obvious to those skilled in the art and, therefore, the scope of the instant invention is limited only by the appended claims.

We claim:
1. A process for the removal of soluble organic impurities from trona in the manufacture of dense soda ash comprising:
    (1) dry mining the crude trona,
    (2) crushing the crude trona,
    (3) calcining the crude trona at a temperature and for a time sufficient to convert the crude trona into crude sodium carbonate and insufficient to remove substantial quantities of soluble organic impurities,
    (4) dissolving the calcined crude sodium carbonate to form an aqueous solution of sodium carbonate,
    (5) clarifying and filtering the aqueous solution of crude sodium carbonate to remove insoluble,
    (6) contacting said clarified and filtered aqueous solution of sodium carbonate with activated carbon to thereby absorb and remove substantially all of the soluble organic impurities from said aqueous solution.
    (7) periodically reactivating said activated carbon by contacting the same with water which is approximately 20° F. higher in temperature than the temperature employed in step 6,
    (8) crystallizing and separating sodium carbonate monohydrate crystals from said activated carbon treated aqueous solution of sodium carbonate, and
    (9) calcining said seperated sodium carbonate monohydrate crystals to dense soda ash.

2. A process as stated in claim 1 wherein the temperature employed in step 6 is less than about 190° F.

3. A process as stated in claim 1 wherein the temperature employed in step 6 is between about 150 and 170° F.

4. A process for the removal of soluble organic impurities from trona in the manufacture of dense soda ash which comprises contacting an aqueous solution of sodium carbonate with activated carbon to absorb and remove soluble inorganic impurities from said aqueous solution, subsequently contacting said activated carbon with water at a temperature substantially above the temperature employed in the absorption step to reactivate said active carbon, and thereafter recovering dense soda ash as the product of the process.

5. The process of claim 4 in which said water for contacting said activated carbon is approximately 20° F. higher than the temperature employed in the absorption step.

6. Process for preparing dense sodium carbonate from crude trona comprising: dry mining the crude trona, crushing the crude trona, calcinating the crude trona at a temperature and for a time sufficient to convert the crude trona into crude sodium carbonate but insufficient to remove soluble organic impurities therefrom, dissolving the calcinated crude sodium carbonate to form an aqueous solution of sodium carbonate, clarifying and filtering the aqueous solution of crude sodium carbonate to remove insolubles, contacting said filtered aqueous solution with activated carbon to thereby remove substantially all of the soluble organic impurities from said aqueous solution, periodically reactivating said activated carbon by contacting same with water which is relatively hot with respect to the temperature of the aqueous solution employed in the previous step, crystallizing and separating sodium carbonate monohydrate crystals from said aqueous solution and calcinating said separated sodium carbonate monohydrate crystals to dense soda ash.

References Cited

UNITED STATES PATENTS 2,346,140  4/1944  Pike _____ 23—63
2,962,348  11/1960  Seglin et al. _____ 23—63

FOREIGN PATENTS 3,275  1862  Great Britain.

OSCAR R. VERTIZ, Primary Examiner

H. S. MILLER, Assistant Examiner

U.S. Cl. X.R.
252—420